Figure 3:
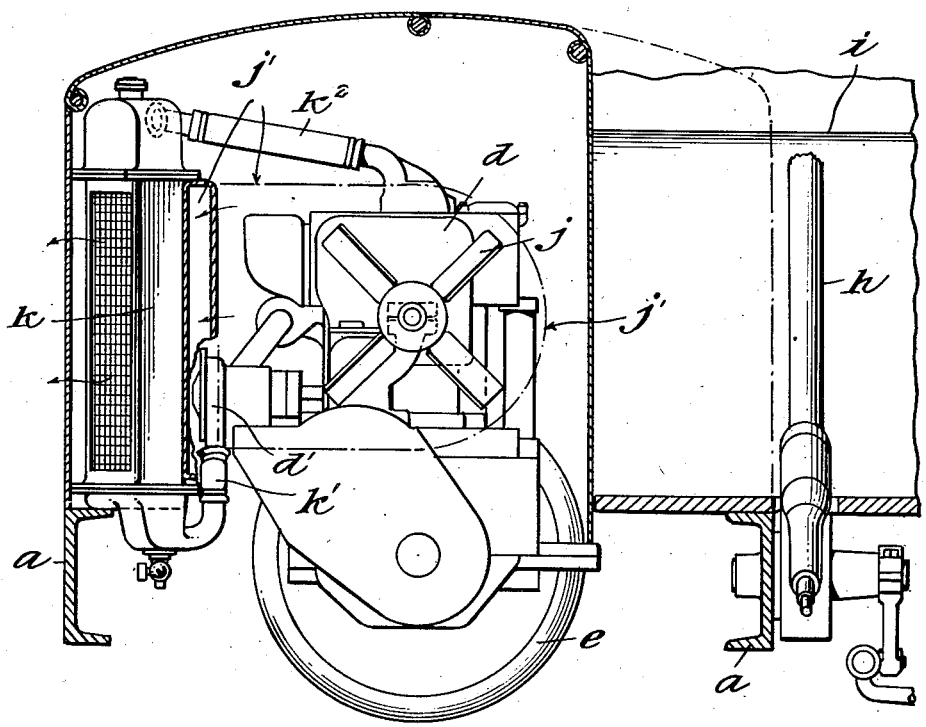

Jan. 19, 1932.  A. F. MASURY  1,842,038
TRUCK CHASSIS AND PLATFORM
Filed June 10, 1930  2 Sheets-Sheet 1
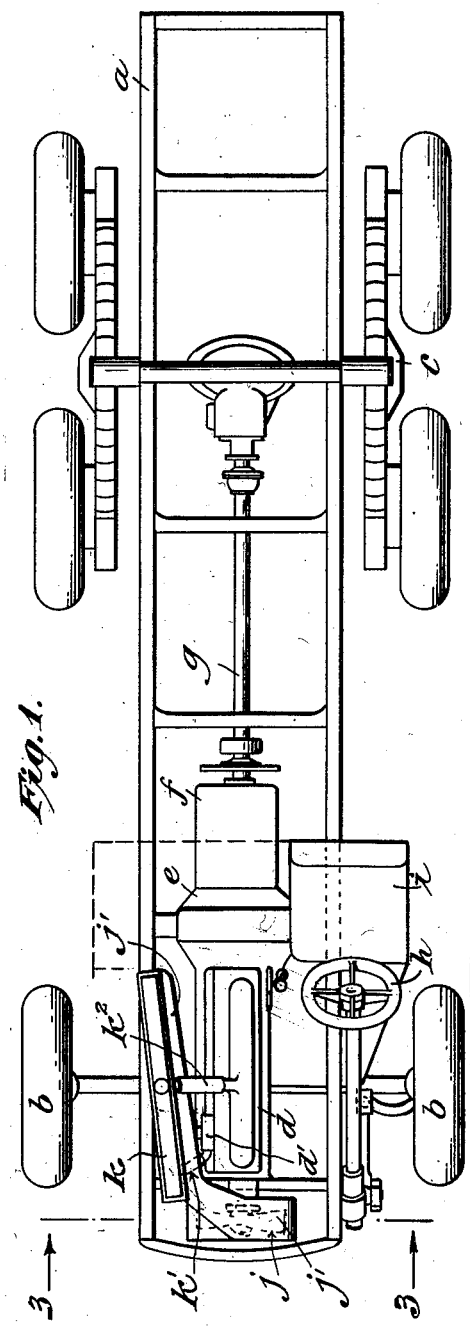
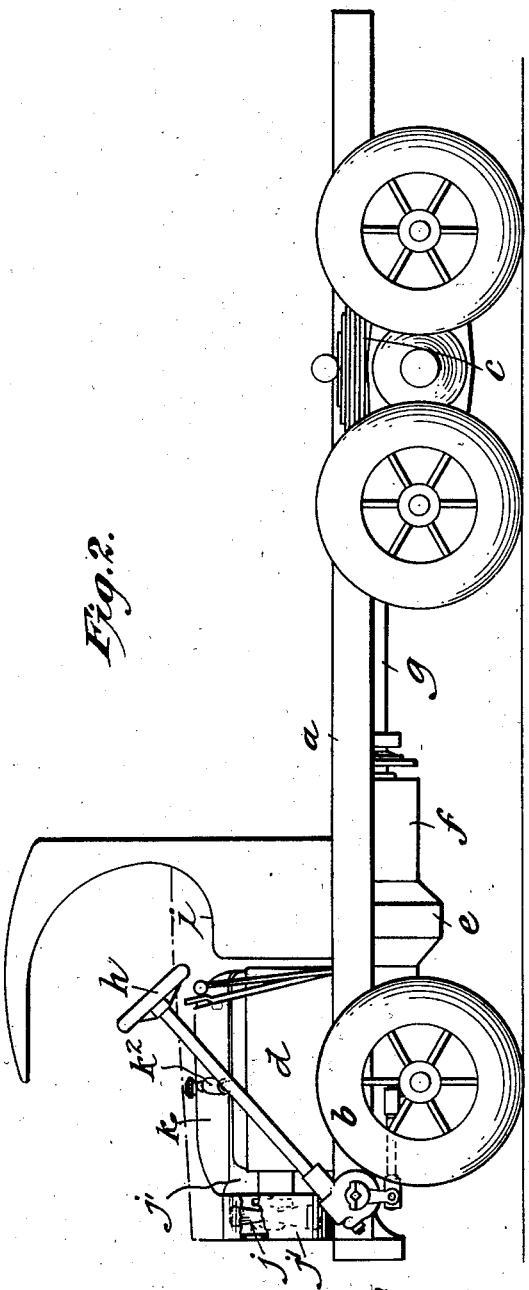
Inventor:
Alfred F. Masury
By his Attorneys
Redding, Greeley, O'Shea & Campbell

Patented Jan. 19, 1932

1,842,038

UNITED STATES PATENT OFFICE

ALFRED F. MASURY, OF NEW YORK, N. Y., ASSIGNOR TO INTERNATIONAL MOTOR COMPANY, OF NEW YORK, N. Y., A CORPORATION OF DELAWARE

TRUCK CHASSIS AND PLATFORM

Application filed June 10, 1930. Serial No. 460,118.

The present invention relates to vehicle chassis and body constructions and embodies, more particularly, an improved truck chassis of a type providing relatively great platform space for the body without reducing the size and strength of the parts thereof. In truck chassis constructions, the size of the platform which carries the body bears a definite relationship to the portion of the chassis occupied by the driver's seat, engine and related structure. The wheel base of the truck is usually designed with respect to the platform space of the chassis so that the normal load will be distributed uniformly between the front and rear wheels.

It has been found that the rear wheels frequently bear a greater portion of the load than the front wheels, due to the tendency to place the load at the rear of the body, thus causing the force moment of the load to be unequally disposed with respect to the corresponding moments exerted upon the front wheels. It is thus quite possible, and in fact it frequently occurs, that the entire load of the body is carried by the rear wheels, a condition which is extremely undesirable in practice.

An object of this invention is to provide a truck platform which is of maximum size to carry the pay load.

A further object of the invention is to provide a platform construction of such type that the distribution of the load on the vehicle tires will be materially improved without increasing the wheel base and shortening the frame overhang.

Further objects and advantages will appear as the invention is described in greater detail in connection with the accompanying drawings, wherein:

Figure 1 is a plan view of a truck constructed in accordance with the present invention, the position of the driver's cab being shown in dash lines.

Figure 2 is a view in side elevation, showing the truck chassis embodied in Figure 1.

Figure 3 is a view in transverse section, taken on line 3—3 of Figure 1, and looking in the direction of the arrows.
Referring to the above drawings, $a$ designates a truck frame supported upon front wheels $b$ and a rear four wheel bogie truck $c$. The engine $d$, clutch $e$, transmission $f$ and propeller shaft $g$ are of the conventional type and of such character as to space the front and rear wheels in a desired manner with respect to the frame $a$.

In existing forms of trucks the driver's seat and wheel have been disposed rearwardly of the engine and clutch, a second dash being provided to separate the driver's cab from the engine. Some types of trucks include a radiator and cooling system in the dash thus mounting the engine at the extreme forward portion of the chassis.

In the present invention, however, the steering wheel $h$ and associated mechanism is disposed on the left hand side of the engine, the driver's seat $i$ being mounted to the left of the clutch housing $e$ as clearly shown in Figure 1. The cooling system of the truck comprises a fan $j$ and radiator $k$, the fan being mounted forwardly of the engine and driven therefrom through a suitable driving mechanism. A housing $j'$ is mounted over the fan and serves as a conduit to direct the flow of cooling air from the fan to the radiator $k$ as will be clearly seen from Figures 1 and 3. A suitable conduit $k'$ communicates between the engine driven water pump $d'$ and the radiator $k$, the cooling medium being conducted from the engine to the radiator through conduit $k^2$. In this manner, the circulation of water is provided and the flow of the cooling medium created by the fan $j$ is utilized to effect the cooling thereof. The radiator as will be apparent from Figures 1 and 3, is disposed upon the opposite side of the engine from the steering mechanism and is mounted directly upon the side frame member as clearly shown in Figure 3.

By means of the foregoing construction, considerable space is saved and the length of the platform materially increased. The distribution of the load is bettered by reason of the fact that the platform extends nearer to the front wheels than in existing types of trucks and the frame overhang at the rear of the truck is decreased. The driving elements and associated mechanism are not changed, thus enabling standard parts to be used throughout the truck and eliminating considerable weight. The frame in the improved construction is subjected to fewer twisting and bending stresses and the resulting vehicle is found to be greatly improved over existing forms. While the invention has been described in connection with the specific construction shown in the accompanying drawings, it is not to be limited, save as defined in the appended claim.

I claim as my invention:

A vehicle comprising a frame, an engine and clutch mounted thereon, a steering mechanism mounted on one side of the engine, a radiator mounted on the other side of the engine, a fan in front of the engine and communicating through a conduit with the radiator, and a driver's seat mounted rearwardly of the engine, and to one side of the clutch.

This specification signed this 7th day of June, A. D. 1930.

ALFRED F. MASURY.